United States Patent [19]

Trobaugh

[11] Patent Number: 4,497,435
[45] Date of Patent: Feb. 5, 1985

[54] CONTROL AIR EXHAUST FOR HUMIDISTAT

[75] Inventor: Arnold G. Trobaugh, Milwaukee, Wis.

[73] Assignee: Johnson Service Company, Milwaukee, Wis.

[21] Appl. No.: 549,276

[22] Filed: Nov. 7, 1983

[51] Int. Cl.³ .............................................. G05D 22/00
[52] U.S. Cl. ..................................... 236/44 A; 137/82
[58] Field of Search ...................... 236/44 A, 44 R, 87; 137/82

[56] References Cited

U.S. PATENT DOCUMENTS

| | | | |
|---|---|---|---|
| 1,151,814 | 8/1915 | Norwood et al. | 236/44 R X |
| 2,651,468 | 9/1953 | Joesting | 236/44 A |
| 3,563,458 | 2/1971 | Martin | 236/44 A |
| 3,718,280 | 2/1973 | Russell | 236/44 R |
| 3,770,195 | 11/1973 | Franz | 236/87 X |
| 3,930,612 | 1/1976 | Brakebill et al. | 236/87 X |
| 4,323,112 | 4/1982 | Nordeen | 236/87 X |

Primary Examiner—William E. Tapolcai
Attorney, Agent, or Firm—Larry L. Shupe; Joseph J. Jochman, Jr.; John Phillip Ryan

[57] ABSTRACT

An apparatus for maintaining a relatively moist ambient gas in intimate contact with a humidity sensing element includes a control nozzle for flowing relatively dry pneumatic control gas therethrough. The nozzle is adapted to be modulated for controlling the humidity within a space. A rigid control cone is coupled to the nozzle for defining a cavity therebetween and having a fixed volume. The cone includes a pin member which is movable with respect to the cone for effecting nozzle modulation. A discharge spigot is disposed in fluid flow communication with the cavity, the spigot being arranged for exhausting the pneumatic control gas to a region remote from the humidity sensing element.

1 Claim, 4 Drawing Figures

CONTROL AIR EXHAUST FOR HUMIDISTAT

FIELD OF THE INVENTION

This invention relates generally to pneumatic control devices and more particularily, to an apparatus for exhausting relatively dry control air from a humidistat, thereby permitting the relatively moist ambient air to be maintained in intimate contact with a humidity sensing element.

BACKGROUND OF THE INVENTION

In building temperature and humidity control systems, a typical arrangement includes one or more compressors for supplying a pressurized pneumatic control fluid, usually air, to a pneumatic control bus disposed within the building walls. Controlling devices such as thermostats and humidistats are coupled to this control bus and to remotely located equipment such as furnaces, air conditioners or humidifiers for regulating and maintaining a particular condition within a space such as a building room. In order to avoid undesirable moisture condensation within the lines or tubing comprising the pneumatic control bus, the pressurized fluid discharged from the compressor is often dehumidified to a relatively low humidity level, typically only a few percent.

Since control devices such as humidistats are coupled directly to this control bus and since such humidistats modulate the control bus pressure for generating a control output signal, it is apparent that any relatively dry pneumatic control fluid which is allowed to contact the humidity sensing element will cause an incorrect control signal to be generated. Specifically, the element will incorrectly sense that the surrounding ambient air has a substantially lower humidity level than exists, in fact. While the problem is lessened to a degree by substantial air movement within the room which may naturally aspirate the humidistat, it may become more acute in sealed rooms with little or no air movement and particularly so where the level of relative humidity of the fluid in the pneumatic control bus is very low compared to that of the room ambient air.

One approach to the solution of aspirating devices such as thermostats and humidistats is embodied in humidistat transmitter model H-52-112 available from Robertshaw Controls Co. This device incorporates a flexible rubber boot for surrounding and covering the control nozzle. The boot incorporates a movable diaphragm portion having a pin molded thereinto and movable therewith for positionably modulating a steel sphere to regulate the effective area of the nozzle orifice. An exhaust passage is in fluid communication with the space between the boot and the nozzle for flowing dry control air to the device exterior. The presence of the diaphragm introduces a spurious, spring-like force which may impair the accuracy of control.

Another approach is shown in U.S. Pat. No. 3,232,112 which illustrates an aspirator jet nozzle disposed upstream, separate from and in parallel with the modulated control port. The nozzle directs a jet of air toward an elongate aperture or slot which creates a Venturi effect to force air out of certain exhaust slots, thereby drawing ambient air inwardly through other intake slots.

Yet another approach is shown in U.S. Pat. No. 3,998,384 which shows an aspirator member disposed on the upstream side of the control port. The member includes a housing having a plurality of shaped chambers and an output jet for directing air toward a rectangular slot in the rear of the apparatus housing. Ambient air is thereby drawn by Venturi action into the housing through intake slots.

Still another approach is shown in U.S. Pat. No. 4,141,496 which uses an aspirator pipe upstream from and in parallel with the device control port. A jet of air is directed through a nozzle and across an aperture for the purpose of drawing ambient air into the device housing by Venturi action.

While these devices have heretofore been satisfactory, they tend to be characterized by certain disadvantages. In particular, those described in the aforementioned patents employ a separate source of aspirating air for effecting a circulation of ambient air to maintain device accuracy. Since these sources of aspirating air represent an additional load demand for the building compressors, they have adverse implications for compressor sizing and/or for the number of installed pneumatic buses. An apparatus which incorporates a discharge element in series with and downstream from the control port, which avoids the introduction of possibly-spurious forces into the control mechanism and which directs the control port air itself to the exterior of a humidistat housing, thereby avoiding the necessity for constructing and installing parallel air supplies requiring increased compressor capability would be a distinct advance in the art.

SUMMARY OF THE INVENTION

In general, an apparatus for maintaining a relatively moist ambient gas in intimate contact with a humidity sensing element includes a control nozzle for flowing relatively dry pneumatic control gas therethrough. The nozzle is adapted to be modulated for controlling the humidity within a space. A rigid control cone is coupled to the nozzle for defining a cavity therebetween and having a fixed volume. The cone includes a member which is movable with respect to the cone for nozzle modulation. A discharge spigot is disposed in fluid flow communication with the cavity, the spigot being arranged for exhausting the pneumatic control gas to a region remote from the humidity sensing element.

DESCRIPTION OF A PREFERRED EMBODIMENT

Figure 1:
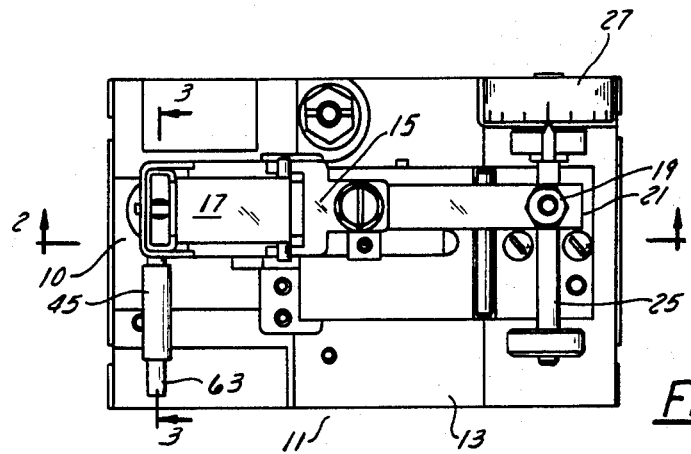
FIG. 1 is a top plan view of a humidistat with cover removed and incorporating the apparatus of the present invention.
Figure 2:
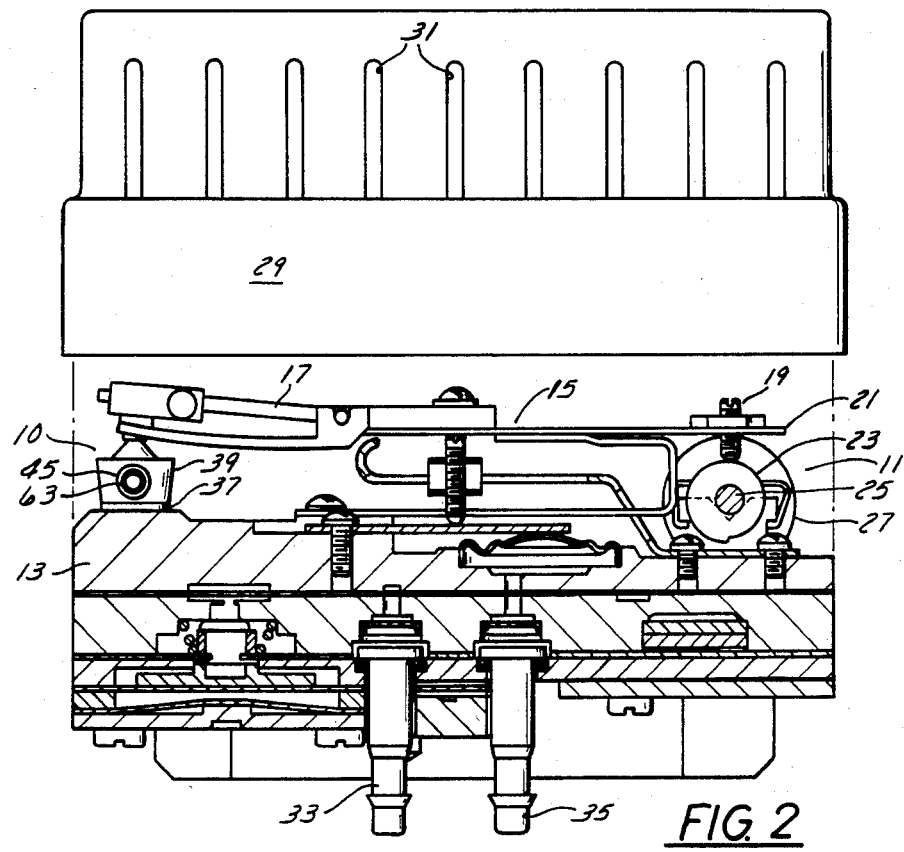
FIG. 2 is a side elevation view of the humidistat taken generally along the plane 2—2 of FIG. 1, with portions shown in cross section, portions shown in full representation, yet other portions shown broken away and with the humidistat cover removed therefrom.

Referring to FIGS. 1 and 2, the modulating assembly apparatus 10 of the present invention is shown in connection with a humidistat 11 having a base member 13 and a pivotably mounted humidity sensing arm 15 supported thereby and arranged for the positioning, modulating control of the apparatus 10 to effect humidity regulation. A humidity sensing element 17 is supported upon the arm 15, the latter having an adjustment screw 19 located at an arm distal end 21. The screw 19 is arranged to have an end thereof bearing upon the periphery of a cam 23. The cam 23, in turn, is attached to a shaft 25, an end of which is coupled to a selection wheel 27 whereby the user may select the humidity level which is desired to be maintained within a room. Changes in humidity will cause expansive or contractive movement of the element 17 which, in turn, will modulate the apparatus 10.

Figure 4:
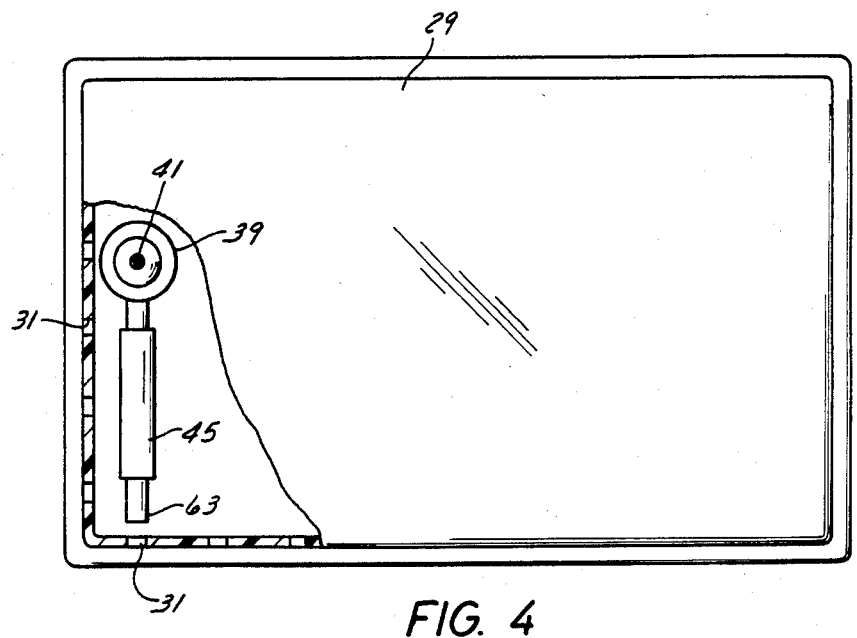
FIG. 4 is a top plan view of the humidistat of FIG. 2 with cover in place and portions thereof broken away and with other portions removed for clarity.

As best seen in FIGS. 2 and 4, the humidistat 11 includes a rigid cover 29 which may be conveniently molded of a plastic material and sized to slidably engage with and be supported by the base member 13 for substantially surrounding and protecting the interior mechanism of the humidistat 11. The cover 29 includes a plurality of vertically disposed, spaced apart elongate apertures 31 formed therein for permitting the free flow of relatively moist air through the cover interior.

The humidistat 11 also includes an inlet nipple 33 adapted to be coupled to a pneumatic control bus (not shown) for providing a source of pressurized control gas to the humidistat 11. The pressurized gas from the control bus is directed from the inlet nipple 33 to the inventive apparatus 10 by a channel (not shown) interior the base member 13. The arm 15 supporting the humidity sensing element 17 coacts with the apparatus 10 for generating a pneumatic pressure control signal which is directed to the outlet nipple 35 for controlling the room humidification equipment.

Figure 3:
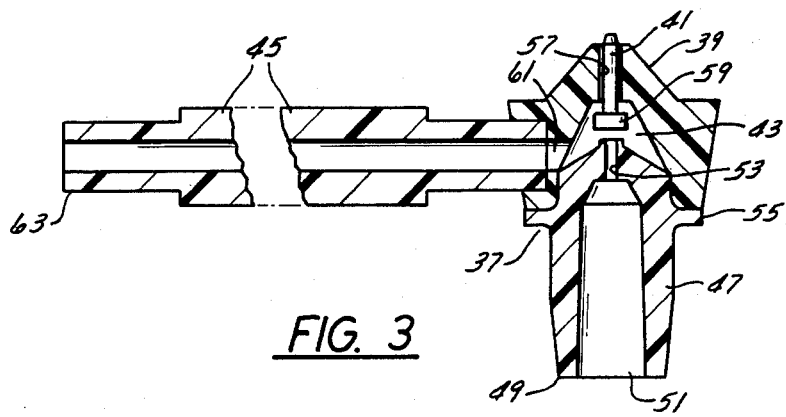
FIG. 3 is a cross-sectional end elevation view of the invention taken generally along the plane 3—3 of FIG. 1.

Referring next to FIGS. 2, 3 and 4, the apparatus 10 is shown to include a control nozzle 37 for flowing relatively dry pneumatic control gas therethrough, the nozzle 37 being adapted to be modulated for generating the output control signal, thereby controlling the humidity within the space. A rigid control cone 39 is coupled to the nozzle 37 and includes a pin member 41. The pin member 41 is movable with respect to the cone for effecting nozzle modulation. The nozzle 37 and the cone 39 define a cavity 43 of fixed volume therebetween for receiving the control fluid flowing through the nozzle 37 and for exhausting this fluid through a discharge spigot 45.

More particularly, the nozzle 37 includes an elongate, generally cylindrical body member 47 having a first end 49 adapted to be coupled to a suitably restricted control bus via the inlet nipple 33 and channel located in the base member 13. The nozzle 37 has an enlarged control chamber 51 for receiving the pressurized gas and a control orifice 53 of reduced diameter and in fluid flow communication with the chamber 51. Surrounding the nozzle body member 47 is a skirt member 55 for engaging and supporting the control cone 39 coupled thereto in fluid sealing engagement therewith. The cone 39 includes an elongate aperture 57 formed therein and sized to receive the movable pin member 41 in closely fitted, sliding engagement therewith to result in a sealing area having a substantially greater resistance to gas flow than is presented by the cavity 43 and the spigot 45. The pin member 41 has an enlarged head 59 for modulating the flow of gas through the orifice 53 and into the cavity 43. The pin member 41, cone 39 and nozzle 37 are constructed and arranged so that the upper end of the pin member 41 is maintained in contact with the arm 15 upon which the humidity sensing element 17 is mounted and the head 59 is maintained in a gas flow modulating relationship to the orifice 53. A slight change in humidity will cause the pin member 41 to move downwardly and will bring the head 59 in closer proximity to the orifice 53, thereby further restricting the flow of control gas therethrough for generating a control signal. The pin member 41, being freely slidable in the cone 39, has its upper end maintained in contact with the arm 15 by the force of the control gas exiting the orifice 53 and impinging against the head 59. Control fluid flowing through the control chamber 51, the orifice 53 and the space defined between the orifice and the head is received in the cavity 43 and thence flows through a hole 61 in the cone sidewall to a tubular discharge spigot 45.

Referring next to FIGS. 1 and 4, the discharge spigot 45 is selected to have a length such that its exhaust end 63 terminates closely adjacent to and slightly interior of an aperture 31 formed in the sidewall of the cover 29. In this manner, the relatively dry control fluid flowing through the conduit defined by the chamber 51, the orifice 53, the cavity 43 and the spigot 45 will be exhausted exterior the humidistat control cover 29. Additionally, a degree of Venturi action will occur to aid in aspirating the space within the cover 29. In that manner, the relatively moist ambient air present within the cover 29 is maintained in intimate contact with the humidity sensing element 17 and accurate humidity control will result. From the foregoing, it will be apparent to those of ordinary skill in the art that the apparatus 10 of the present invention is effective for exhausting the relatively dry control air from the humidistat 11 without the necessity of resorting to auxiliary aspirating mechanisms which would otherwise add additional cost to the humidistat 11 and which may have adverse implications for the sizing of the building compressors. The nozzle 37, cone 39 and pin member 41 are preferably formed by molding a plastic material, the pin members preferably being formed of a material available under the name Oilon, a trademark of TFE, Inc., a DAYCO company. Molding in this manner will help assure that the pin member 41 and cone 39 have closely fitted yet smooth, freely slidable engagement one with the other.

While only a single preferred embodiment has been shown and described herein, the invention is not intended to be limited thereby but only by the scope of the claims which follow.

I claim:

1. An apparatus for controlling the humidity within a space and including a humidity sensing element moveable in response to changes in said humidity for control thereof, said apparatus including:
    a base member;
    a modulating assembly supported by said base member;
    a humidity sensing element supported upon said base member and arranged for positioning control of said modulating assembly to effect said humidity regulation;
    a cover for substantially surrounding and protecting said sensing element and said modulating assembly, said cover including a plurality of apertures for permitting the free flow of relatively humid air therethrough;
    said modulating assembly including a pneumatic control nozzle for flowing relatively dry pneumatic control fluid therethrough, a rigid control cone coupled to said nozzle and including a pin member movable relative to said cone for nozzle modulation in response to said movement of said sensing element, said nozzle and said cone defining a cavity therebetween having a fixed volume;

a discharge spigot having a first end and a second end, said first end being attached to said modulating assembly in fluid flowing communication with said cavity for receiving said pneumatic control fluid therethrough, said second end terminating adjacent one of said apertures for exhausting said control fluid to a region exterior of said cover.

* * * * *